(12) United States Patent
Ruiz et al.

(10) Patent No.: US 11,070,675 B1
(45) Date of Patent: Jul. 20, 2021

(54) SYSTEM, DEVICE, AND METHOD FOR RINGLESS VOICEMAIL DELIVERY

(71) Applicant: Magnify Telecom LLC, Las Vegas, NV (US)

(72) Inventors: Lauro Ruiz, Mesa, AZ (US); Jonathan Walker, Mesa, AZ (US); John Oesterle, Bonita, CA (US); Kris Droge, Chula Vista, CA (US)

(73) Assignee: MAGNIFY TELECOM, LLC, Las Vegas, NV (US)

( * ) Notice: Subject to any disclaimer, the term of this patent is extended or adjusted under 35 U.S.C. 154(b) by 0 days.

(21) Appl. No.: 16/985,693

(22) Filed: Aug. 5, 2020

(51) Int. Cl.
*H04M 3/533* (2006.01)
*H04L 29/06* (2006.01)

(52) U.S. Cl.
CPC .... *H04M 3/53366* (2013.01); *H04L 65/1006* (2013.01); *H04M 3/53308* (2013.01); *H04M 3/53333* (2013.01)

(58) Field of Classification Search
CPC ....... H04M 3/53308; H04M 3/533333; H04M 3/53366; H04L 65/1006
USPC ...................... 379/88.13, 88.17, 88.22, 88.23
See application file for complete search history.

(56) References Cited

U.S. PATENT DOCUMENTS

| | | | |
|---|---|---|---|
| 8,605,869 B1 | 12/2013 | Mobarak et al. | |
| 8,976,676 B2 | 3/2015 | King et al. | |
| 9,325,596 B2 | 4/2016 | King et al. | |
| 10,033,612 B2 | 7/2018 | Augenstine et al. | |
| 2008/0275883 A1* | 11/2008 | Ashraf | H04L 67/306 |
| 2019/0014214 A1* | 1/2019 | Marchevsky | H04M 3/53366 |
| 2020/0250695 A1* | 8/2020 | Butler | G06Q 30/0213 |

* cited by examiner

*Primary Examiner* — Binh Kien Tieu
(74) *Attorney, Agent, or Firm* — Haynes and Boone, LLP

(57) ABSTRACT

A method and device are presented for delivering a voicemail message to a voicemail system associated with a user device. A first session initiation protocol (SIP) session may be initiated with a first SIP server. Upon receiving a provisional response from the first SIP server, a second SIP session may be initiated with a second SIP server. A response indicating that a call has been successfully established using either the first SIP session or the second SIP session is received. The SIP session in which the call was not established is terminated. Audio from the voicemail system received via the SIP session in which the call was established is analyzed to determine when the voicemail system may receive the voicemail message. The voicemail message is transmitted to the voicemail system via the SIP session in which the call was established.

31 Claims, 7 Drawing Sheets

SYSTEM, DEVICE, AND METHOD FOR RINGLESS VOICEMAIL DELIVERY

BACKGROUND

1. Field

The present disclosure generally relates to voicemail communication, and more specifically, to delivering voicemail messages on user devices without causing the user devices to ring.

2. Related Art

An entity may wish to communicate a message to a number of recipients without the urgency and inconvenience associated with a phone call. For example, a company may wish to notify a list of customers about a service or product, or an organization may wish to deliver an informational message to its members. A phone call may inconvenience recipients by interrupting an activity, while an e-mail or letter may quickly be ignored or discarded. Furthermore, a text message may not be a suitable medium for the message, particularly when recipients are accustomed to text messages being only a few words long. A pre-recorded voicemail message delivered in an automated fashion to devices (e.g., mobile phones) owned by the recipients may allow an entity to communicate the message without the urgency associated with a phone call, or the lack of attention with which a recipient may handle an e-mail, letter, or a long text message. However, delivery of a voicemail message under most circumstances results in a recipient's device ringing, disturbing the recipient in much the same way a phone call would. Methods exist for attempting to deliver a voicemail message to a recipient (callee) without causing the recipient's device to ring, but there are a number of drawbacks associated with known methods.

Ordinarily, a caller can only reach a recipient's voicemail system under the following conditions: (i) after the recipient's device rings a number of times without being answered, (ii) when the recipient's device is powered off or otherwise disconnected from the telephone network, or (iii) when the caller initiates the call while the recipient's device is receiving a different call. For example, the caller may reach the voicemail system of the recipient's device when the caller initiates a call while the device is already ringing because of a different incoming call at the same time. Some cellular telephone carriers may allow subscribers to directly send voicemail messages to other subscribers—without initiating a phone call—but this feature is generally limited to subscribers of the same service, making it difficult to send a pre-recorded message to a group of recipients using different carriers. A caller may intentionally initiate a first call to a recipient to put the recipient's device in a busy state, and then after a predetermined period of time, initiate a second call designed to be answered by the recipient's voicemail system. If the period of time was correctly determined, the first call may be disconnected after the recipient's device is in a busy state, but before the device actually alerts the user (e.g., by ringing) to the first call, allowing the second call to go to voicemail without the recipient's device ringing because of either call, while also not causing the recipient's device to ring. For example, U.S. Pat. No. 8,605,869 B1 to Mobarak et al. discloses a method that involves using a table of empirically-determined, carrier-specific delay values indicating how long after initiating the first call the caller should wait before terminating it. The delay value may indicate an anticipated length of time between when a call is initiated, and when a recipient's device will ring in response to the call. If a second call is initiated long enough after the first call, but before the duration indicated by the delay value, the second call may reach the device's voicemail system before the first call causes the device to ring. Network conditions, however, may be different when a call is made than when the delay value was determined, such that the delay value may actually be too long, causing the recipient's device to ring as a result of the first call. Alternately, the delay value may be too short, and the second call may be received by the device after the first call was terminated, resulting in the recipient's device ringing as a result of the second call and preventing the second call from reaching the device's voicemail. Furthermore, when changes are made to a carrier's network infrastructure, the delay values may need to be recomputed. U.S. Pat. Nos. 9,325,596 B2 and 8,976,676 B2 to King et al. and U.S. Pat. No. 10,033,612 B2 to Augenstine et al. similarly disclose a method of ringless voicemail delivery based on empirically determined delay values, where the delay values are based on measured network performance. The aforementioned problems with relying on delay values to deliver ringless voicemail messages all reduce the rate of successful message delivery. Thus, there is a need for improved methods of reliably delivering voicemail messages to groups of recipients without disturbing the recipients by causing their devices to ring.

SUMMARY

Exemplary embodiments of the present disclosure provide a method and device that deliver voicemail communications to user devices in a manner that overcomes the drawbacks associated with known techniques.

An exemplary embodiment of the present disclosure provides a method of delivering voicemail communication. The exemplary method includes initiating, by an event session controller of a media server, a first Session Initiation Protocol (SIP) session at a first SIP server. The method further includes receiving, at a first socket listener associated with the first SIP session, a provisional response from the first SIP server, the provisional response indicating a session state. In addition, the method includes initiating, by the event session controller in response to the receiving of the provisional response, a second SIP session at a second SIP server. The method further includes receiving a success response to indicate that a call with a user device was successfully established in association with either the first SIP session or the second SIP session. The success response is received at either (i) the first socket listener from the first SIP server when the call with the user device was successfully established in association with the first SIP session, or (ii) a second socket listener from the second SIP server when the call with the user device was successfully established in association with the second SIP session, the second socket listener being associated with the second SIP session. The method further includes terminating, by the event session controller, in response to the receiving of the success response, the first SIP session or the second SIP session not associated with the success response. In addition, the method includes transmitting, in response to the receiving of the success response, an audio message to a voicemail system associated with the user device.

An exemplary embodiment of the present disclosure provides a computing device that includes a computer-readable recording medium having a computer program recorded thereon, and a processor configured to execute the computer program recorded on the computer-readable recording medium. The processor, by executing the computer program, is configured to cause the computing device to initiate a first SIP session at a first SIP server external to the computing device. The processor is further configured to cause the computing device to associate the first SIP session with a first socket listener service, wherein the processor causes the first socket listener service to receive a provisional response from the first SIP server. The provisional response indicates a session state. The processor is further configured to cause the computing device to initiate, in response to receiving the provisional response, a second SIP session at a second SIP server external to the computing device. In addition, the processor is configured to cause the computing device to associate the second SIP session with a second socket listener service. The processor is further configured to cause the computing device to receive a success response indicating that a call with a user device was successfully established in association with either the first SIP session or the second SIP session. The processor controls (i) the first socket listener service to receive the success response from the first SIP server when the call with the user device was successfully established in association with the first SIP session, and (ii) the second socket listener service to receive the success response from the second SIP server when the call with the user device was successfully established in association with the second SIP session. The processor is further configured to cause the computing device to terminate, in response to receiving the success response, the first SIP session or the second SIP session not associated with the success response. In addition, the processor is configured to cause the computing device to transmit, in response to receiving the success response, an audio message to a voicemail system associated with the user device.

BRIEF DESCRIPTION OF THE FIGURES

The scope of the present disclosure is best understood by referring to the following detailed description of exemplary embodiments when read in conjunction with the accompanying drawings. The following figures are included in the drawings.

Figure 1:
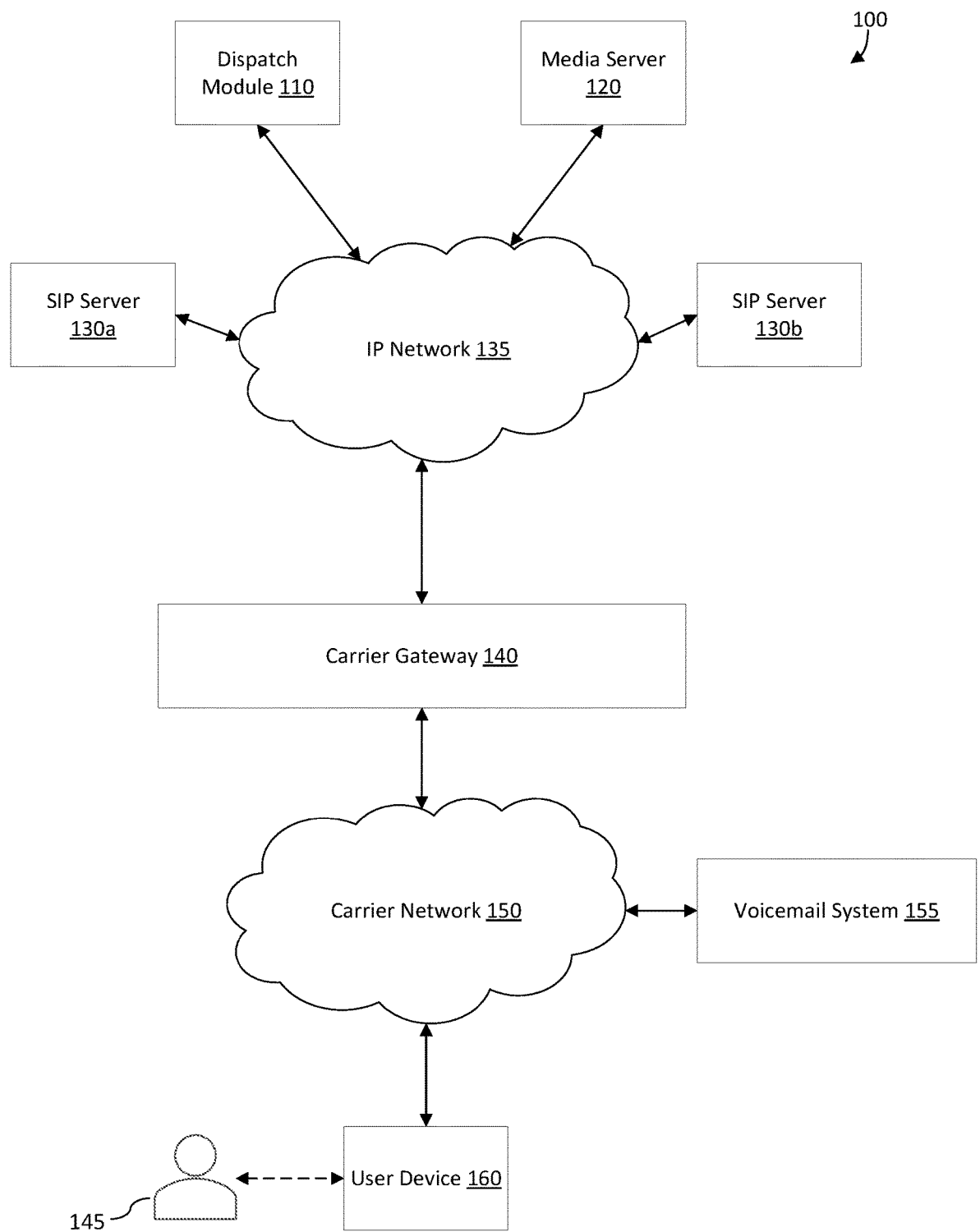
FIG. 1 is a block diagram illustrating a ringless voicemail delivery system according to an exemplary embodiment of the present disclosure.

Further areas of applicability of the present disclosure will become apparent from the detailed description below. It should be appreciated that like reference numerals are used to identify like elements illustrated in one or more of the figures, wherein the drawings are for purposes of illustrating exemplary embodiments of the present disclosure and not for purposes of limiting the same.

DETAILED DESCRIPTION OF EXEMPLARY EMBODIMENTS

The present disclosure describes methods, devices, and systems for delivering voicemail messages on recipient user devices without causing the devices to ring or otherwise alert users (e.g., by vibrating) of an incoming call. As discussed above, a caller may wish to communicate a message via voicemail to a group of recipients without disturbing the recipients by causing their devices to ring. Known methods of attempting to deliver a voicemail message without causing a user's device to ring rely on calling the phone number associated with the device, waiting a predetermined delay period (i.e., the time required for the line to enter busy state), calling the phone number a second time while the first call is active, and then disconnecting the first call, ideally before the phone rings in response to the first call. As discussed above, such methods are cumbersome, particularly with respect to computing and periodically updating the delay period, may depend on carrier-specific settings, and are prone to failure when network conditions change.

In contrast to existing methods, exemplary embodiments of the present disclosure provide a system and device (e.g., a media server) to deliver a voicemail message to user devices across carriers, irrespective of any delay value associated with a carrier, without causing the user devices to ring, or to ring only briefly (e.g., for 2 seconds or less). As described in more detail below with reference to FIGS. 1 and 2, the system may include a media server, a dispatch module, and two or more session initiation protocol (SIP) servers. SIP is a signaling protocol developed by the Internet Engineering Task Force (IETF) and published in RFC 3261 (hereinafter "SIP protocol"), which is incorporated herein by reference in its entirety. SIP provides functionality for establishing and managing multimedia sessions, which can be used to deliver multimedia content—in this case, voicemail messages—to a device.

According to an exemplary embodiment, the media server may deliver an audio message (e.g., a voicemail message) to a voicemail system associated with a user device by initiating two separate SIP sessions at a corresponding one of two separate SIP servers (i.e., one SIP session per server). The media server may listen for responses from the two SIP servers using corresponding socket listeners on the media server that are each respectively associated with one of the SIP servers (i.e., one socket listener per SIP server or SIP session). For example, the media server, through an event session controller at the media server, initiates a first session at a first SIP server and waits for a provisional response indicating either a ringing state (e.g., response code 180 of the SIP protocol, indicating the user device is alerting the user of an incoming call) or a session progress state (e.g., response code 183 of the SIP protocol, indicating that the session is progressing and optionally, that media, such as a ringback tone, is included in the response). In response to the media server receiving the provisional response (through the first socket listener), the media server (through the event session controller) initiates a second SIP session at a second SIP server. The first socket listener and second socket listener listen for a success response (e.g., response code 200 of the SIP protocol) from their corresponding SIP sessions. Once the first or second socket listener receives the success response, the event session controller terminates the SIP session in which the success response was not received. For example, if the first socket listener receives the success response (i.e., the call was successfully established in the first session), the event session controller terminates the second session. Otherwise, if the second socket listener receives the success response (i.e., the call was successfully established in the second session), the event session controller terminates the first session. In response to receiving the success response, the media server transmits the audio message to the voicemail system.

By establishing two SIP sessions, monitoring their progress, and delivering a voicemail message based on which of the two SIP sessions returns a response indicating success, embodiments of the present disclosure provide a reliable way to ringlessly (or with a very short ring) deliver voicemail messages without many of the drawbacks of existing methods that rely on predetermined delay values and/or carrier-specific settings.

FIG. 1 illustrates a ringless voicemail delivery system 100 according to an exemplary embodiment of the present disclosure. The system 100 may employ voice over internet protocol (VoIP) to deliver voicemail messages. The system 100 includes a dispatch module 110, media server 120, and SIP servers 130a and 130b. The dispatch module 110, media server 120, and SIP servers 130a and 130b may communicate with each other via an IP network 135. The media server 120 may communicate with a user device 160 through a carrier gateway 140 connected to the internet protocol (IP) network 135 and a carrier network 150 to deliver voicemail messages at a voicemail system 155 associated with the user device 160. For simplicity, one carrier network 150, voicemail system 155, and user device 160 is illustrated, but the system may communicate with any number of such carrier networks, voicemail systems, and user devices.

According to an exemplary embodiment, the dispatch module 110 may direct the media server 120 to deliver a voicemail message to a voicemail system 155 associated with a user device 160. The dispatch module 110 may select the message to be delivered, and a list of one or more target phone numbers associated with user devices 160 to which the message should be delivered. For each target phone number in the list, the dispatch module 110 may transmit a request to the media server 120 requesting that the media server 120 deliver the message to the voicemail system 155 associated with the phone number corresponding to the user device 160.

Thus, the media server 120 may be used to deliver a voicemail message to a voicemail system 155 associated with a user device 160. The media server 120 may establish SIP sessions with the SIP servers 130a, 130b for establishing a call between the media server 120 and the voicemail system 155 associated with the user device 160. The SIP servers 130a, 130b may communicate requests and responses within SIP sessions between the media server 120 and the carrier gateway 140. The media server 120 may also analyze audio from the voicemail system 155 in response to a call being established, determine when the voicemail system 155 is ready to receive a voicemail message, and deliver the voicemail message to the voicemail system 155.

The dispatch module 110, media server 120, and SIP servers 130a, 130b may be implemented using any appropriate combination of hardware and/or software configured for communication within the IP network 135. In various implementations, the dispatch module 110, media server 120, and SIP servers 130a, 130b may each be respectively embodied by one or more computers (e.g., a personal computer or server computer), where each computer includes a computer-readable recording medium (e.g., a hard disk drive, flash memory, optical memory, etc.) having a computer program tangibly stored (recorded) thereon, a processor configured to execute the computer program to carry out the functions of the dispatch module 110, media server 120, and SIP servers 130a, 130b as described herein, and communication circuitry (e.g., WiFi or Bluetooth card) for communicating with other devices in the system. According to an exemplary embodiment, each computer may include a general-purpose processor (e.g., processors manufactured by Intel, AMD, Qualcomm, Motorola, Samsung, IBM, etc.) or an application-specific processor specifically designed for the respective computer in which it is comprised.

The carrier gateway 140 may establish calls to or from user devices 160 and other devices (e.g., the media server 120), and transmit communications between the devices on the call. The carrier gateway may include a SIP server (as described in FIG. 2) with which the SIP servers 130a and 130b may exchange requests originating from or terminating at the media server 120. The carrier gateway 140 may communicate with a user device 160 and a voicemail system 155 through the carrier network 150, which may be, for example, a radio access network (RAN). The voicemail system 155 associated with the user device 160 may receive voicemail messages for any number of user devices 160 that are part of the carrier network 150. For example, the voicemail system 155 may be a centralized system that manages voicemail for all subscribers of the carrier. Individual mailboxes at the voicemail system 155 may be associated with a phone number corresponding to a user device 160, allowing a user 145 of the user device 160 to access voicemail messages addressed to the user 145 from the user device 160, or from another device (e.g., by calling the phone number associated with the user device 160 and entering a passcode).

According to an exemplary embodiment, the user device 160 may be a mobile phone, tablet, mobile cellular phone, personal computer, wearable computing device (e.g., a smart watch, fitness tracker, etc.), or other portable telecommunications device that may be associated with a phone number. The user device 160 may allow a user 145 to access voicemail messages on the voicemail system 155. For example, the user device 160 may provide a dedicated button or a graphical user interface element for calling the voicemail system 155 and retrieving voicemail messages intended for the user 145. According to an exemplary embodiment, the voicemail system 155 may deliver voicemail messages directly to the user device 160 after they are recorded by the voicemail system 155, so that a user 145 may access the voicemail message without an active connection to the voicemail system 155. According to an exemplary embodiment, the user device 160 may present an alert indicating that a voicemail message has been received. The user device 160 may also alert the user 145 of an incoming call (e.g., by ringing or vibrating), or of a missed call (e.g., by displaying an alert on a screen of the user device 160).

Figure 2:
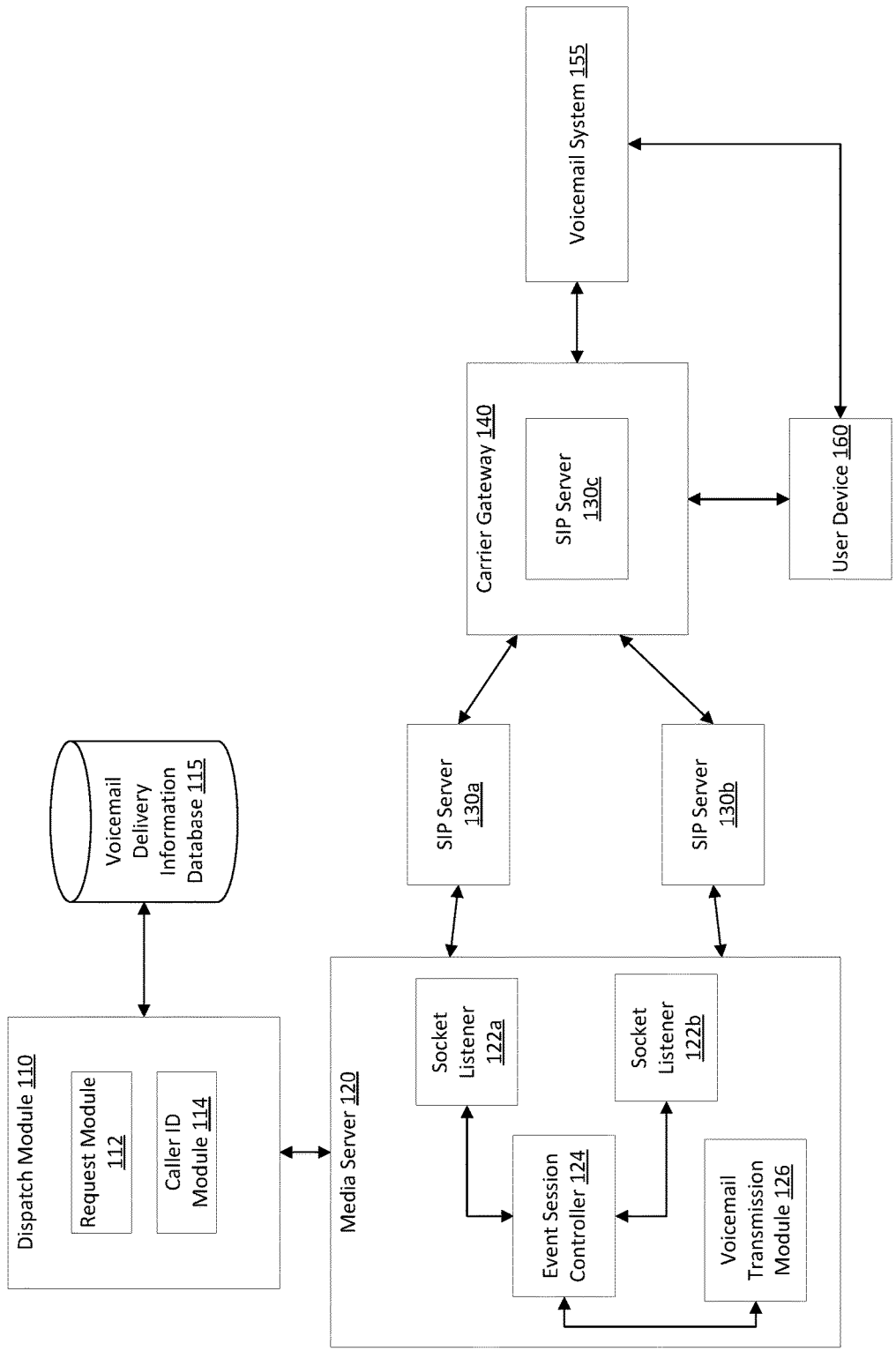
FIG. 2 illustrates constituent elements of the dispatch module and media server in more detail in association with other devices in the ringless voicemail delivery system illustrated in FIG. 1.

FIG. 2 illustrates constituent elements of the dispatch module and media server in more detail in association with other devices in the ringless voicemail delivery system illustrated in FIG. 1 according to an exemplary embodiment of the present disclosure. The media server 120 may include an event session controller 124, socket listeners 122a and 122b, and a voicemail transmission module 126. The socket listeners 122a and 122b and voicemail transmission module 126 may be software executed on the media server 120. The media server 120 may receive a request from a request module 112 of a dispatch module 110 to deliver a voicemail message to a voicemail system 155 associated with a user device 160. Though illustrated as being external to the media server 120 in FIG. 2, the dispatch module 110 may be a component of the media server 120, according to an exemplary embodiment of the present disclosure. The dispatch module 110 may send a number of such requests to the media server 120. For example, a voicemail delivery information database 115 may store a number of voicemail messages (e.g., audio recordings of messages, or text which can be converted to audio recordings). Each voicemail message may be associated with a list of one or more target phone numbers, where each target phone number is associated with a user device 160 to which the voicemail message is to be delivered. The request module 112 may retrieve from the voicemail delivery information database 115 a voicemail message and the associated target phone number list.

For each phone number in the target phone number list, the request module 112 may create a request that includes the voicemail message, the target phone number, and two source phone numbers from which SIP sessions initiated by the media server 120 should originate. The two source phone numbers may be different from each other. In an alternative exemplary embodiment, the two source phone numbers may be the same. The source phone numbers may be selected by the caller ID module 114, and may appear on the user device 160 as the phone number of the caller from which the voicemail message originated and/or as part of an alert indicating an incoming or missed call. According to an exemplary embodiment, the caller ID module 114 may select the source phone numbers based on a reputation score associated with the phone number, as described below in connection with FIG. 6. For example, the caller ID module 114 may select a phone number based on its associated reputation score being below a threshold. According to an exemplary embodiment, the caller ID module 114 may load balance source phone numbers to prevent calls from being associated with spam or throttled by a carrier gateway 140. For example, a carrier or third-party service may tag a phone number from which a large number of calls originate in a short period of time as a phone number associated with spam. As a result, subsequent calls from the phone number may be blocked, or the user device 160 may display (e.g., as part of the caller ID information associated with the call) an indication that the phone call is likely an advertisement, decreasing the likelihood of successful voicemail message delivery, and/or of a user listening to the voicemail message even if successfully delivered. To account for this, the caller ID module 114 may load balance the source phone numbers used by requests by rotating through a list of available phone numbers when selecting a source phone number. For example, the caller ID module 114 may have a list of 20 available phone numbers. The caller ID module 114 may select the first number on the list as the source phone number for a first request, the second number for a second request, and so on. Alternatively, the caller ID module 114 may select a new number from the list after a set number of requests using a source phone number (e.g., the caller ID module may select a new phone number as the source phone number every 8 requests).

According to an exemplary embodiment, the media server 120 may receive the request to deliver the voicemail message from the dispatch module 110 at the event session controller 124. The event session controller 124 may then initiate a first SIP session with SIP server 130a. For example, the event session controller 124 may create an invite request and transmit it to SIP server 130a. The invite request may include the source phone number and target phone number indicated in the request received from the dispatch module 110. The invite request may also include a call identifier uniquely identifying the SIP session. The call identifier may be a randomly generated string, and may include a prefix indicating that the call identifier is associated with the first SIP session (e.g., "S1-"). For example, the call identifier may be S1-befxra65430b011ae6024. SIP server 130a may transmit the request to the carrier gateway 140 (e.g., to SIP server 130c), which may respond with a provisional response. The provisional response may include response code 180 of the SIP Protocol, indicating a ringing state (e.g., the device is alerting the user of the call), or response code 183 of the SIP Protocol, indicating session progress information (e.g., that the session is progressing and optionally, that media such as a ringback tone is included)). SIP server 130a may then transmit the provisional response to the socket listener 122a. According to an exemplary embodiment, the socket listener 122a may notify the event session controller 124 of the provisional response, and in response to being notified of the provisional response, the event session controller 124 may initiate a second SIP session at SIP server 130b, following the same process described above with respect to the first SIP session. The invite request for the second SIP session may include a different source phone number (included in the request from the dispatch module 110) than the one included with the invite request for the first SIP session. The call identifier included in the invite request may be the same as for the first SIP session, except with a different prefix indicating that the call identifier is associated with the second SIP session (e.g., the call identifier may be S2-befxra65430b011ae6024). The unique call identifier associated with each corresponding SIP session may be included in each request transmitted by the event session controller and each response received by event session controller 124. For simplicity, two SIP servers 130a and 130b—one for each SIP session—are discussed throughout this disclosure, but a single SIP server may alternatively be used for both SIP sessions. For example, a single SIP server may use the unique call identifier associated with each SIP session to distinguish responses corresponding to the first SIP session from those corresponding to the second SIP session. In some embodiments, the SIP servers 130a and 130b (or a single SIP server) may be part of the media server 120 rather than external components as illustrated. For example, a SIP server may run as a process on the media server 120, or the event session controller 124 may include SIP server functionality.

Once the invite request has been transmitted to SIP server 130b, the socket listener 122b listens for responses from SIP server 130b (originating from the carrier gateway 140), while the socket listener 122a listens for responses from SIP server 130a. Socket listener 122a or socket listener 122b may receive a success response (e.g., response code 200 of the SIP Protocol) from SIP server 130a or SIP server 130b, respectively, originating at the carrier gateway 140, indicating that a call was successfully established in the corresponding session. In particular, if socket listener 122a receives a success response from SIP server 130a, the success response indicates that the call was established in association with the first SIP session. Alternatively, if socket listener 122b receives a success response from SIP server 130b, the success response indicates that the call was established in association with the second SIP session. The event session controller 124 receives the success response from the socket listener 122a or 122b that received it in association with the SIP session in which the call was established. According to an exemplary embodiment, in response to receiving the success response, the event session controller 124 terminates the SIP session not associated with the success response. For example, if the event session controller 124 receives the success response from socket listener 122a because the call was established in association with the first SIP session, the event session controller 124 terminates the second SIP session, because the second SIP session is not associated with the success response. Alternatively, if the event session controller 124 receives the success response from the socket listener 122b because the call was established in association with the second SIP session, the event session controller 124 terminates the first SIP session, because the first SIP session is not associated with the success response. The event session controller 124 may also direct the voicemail transmission module 126 to transmit the voicemail message to the voicemail system 155 associated with the user device 160 on the SIP session associated with the success response (i.e., either the first SIP session or the second SIP session). The voicemail transmission module 126 may receive and analyze audio from the voicemail system 155 as described below in connection with FIG. 5 to determine when the voicemail system 155 is ready to receive the voicemail message, then transmit the voicemail message to the voicemail system 155 (e.g., by playing an audio file containing the voicemail message). In the exemplary embodiment described above, the event session controller 124 initiates a first SIP session with SIP server 130a, and then, upon receiving the provisional response, initiates a second SIP session with SIP server 130b. The present disclosure is not limited to this order. The event session controller 124 may alternatively initiate a first SIP session with SIP server 130b, and then, upon receiving the provisional response, initiate a second SIP session with SIP server 130a.

Figure 3:
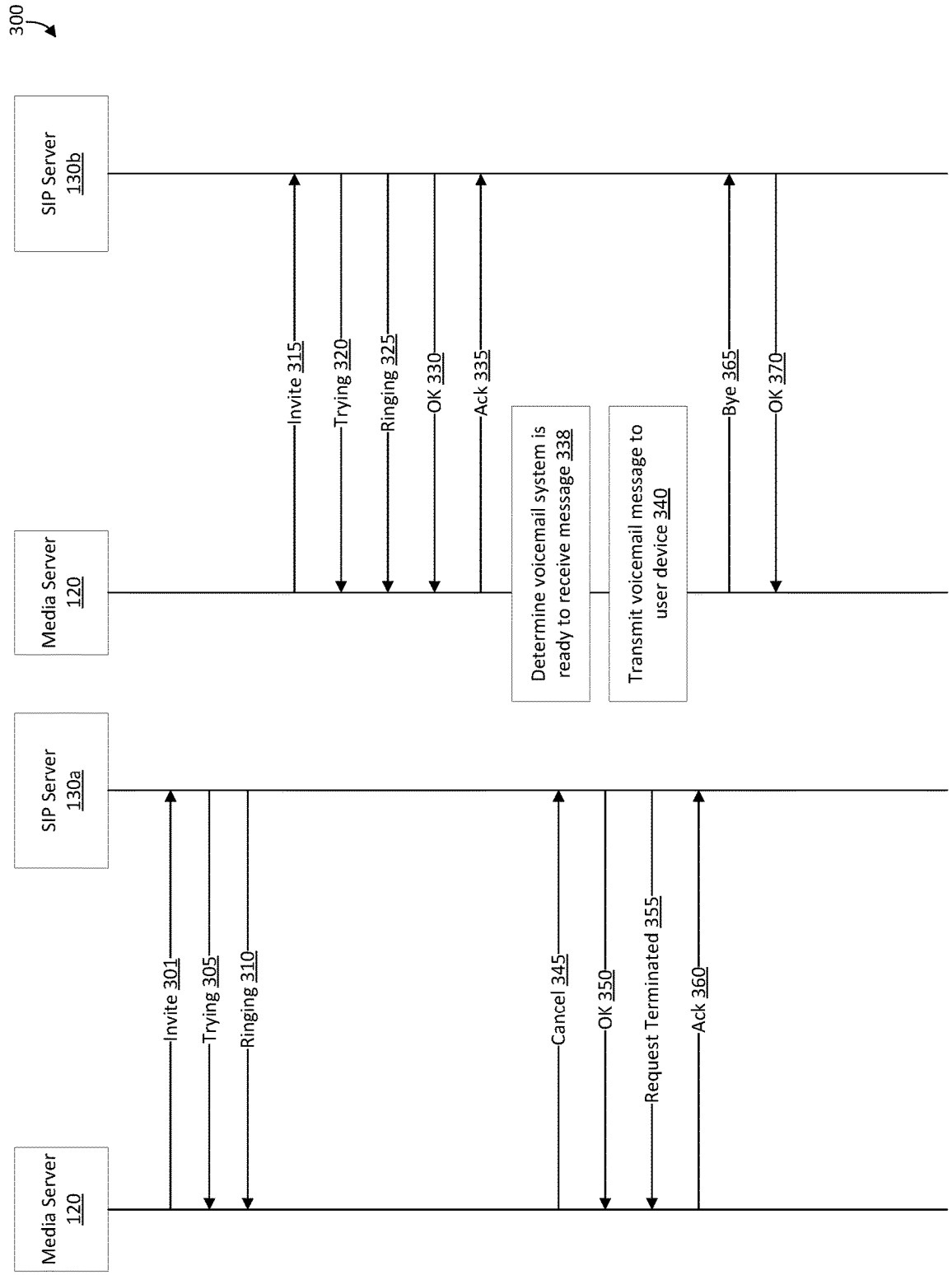
FIG. 3 illustrates a sequence of interactions between a media server and two SIP servers for delivering voicemail messages according to an exemplary embodiment of the present disclosure.
Figure 4:
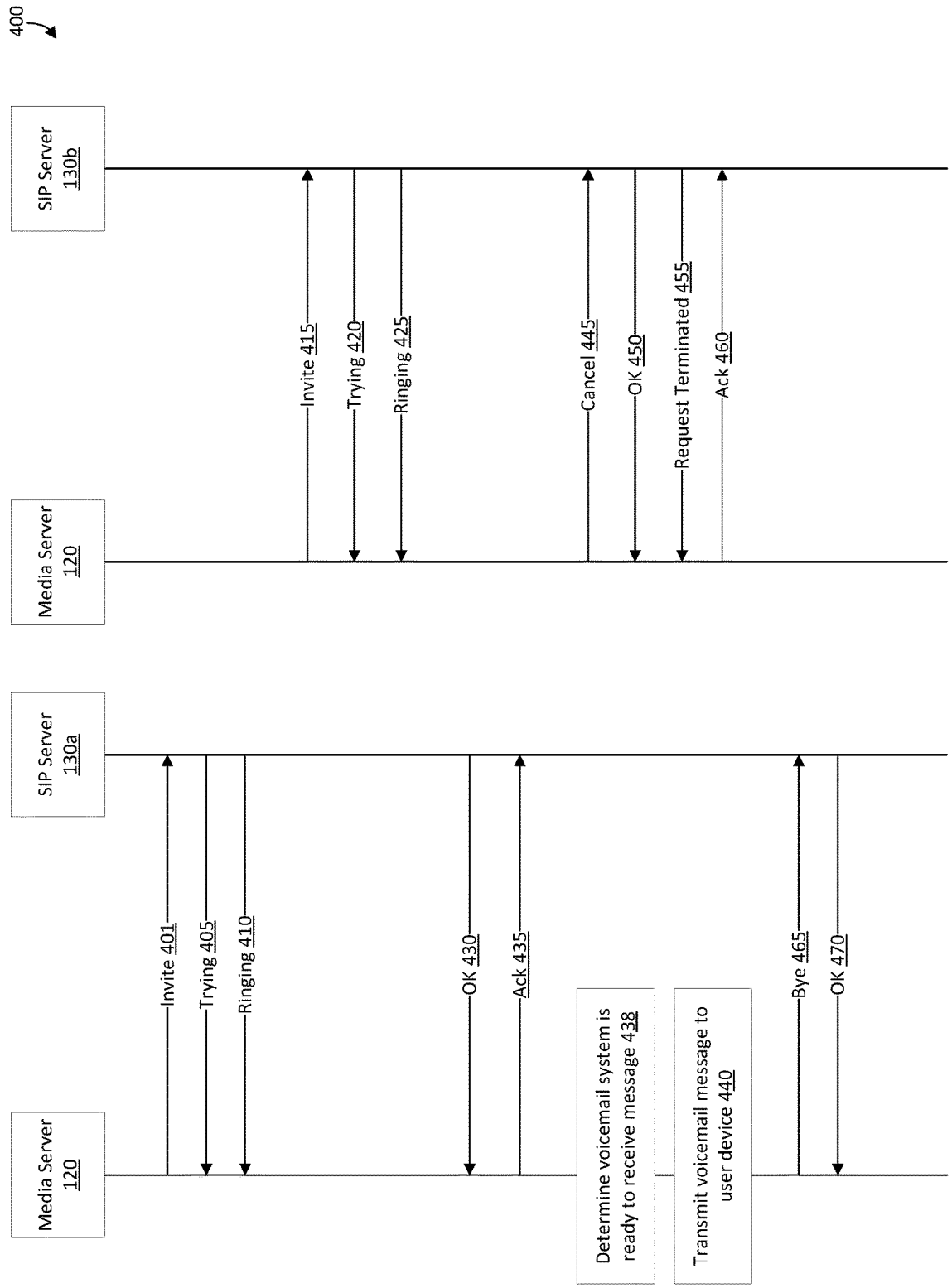
FIG. 4 illustrates a sequence of interactions between a media server and two SIP servers for delivering voicemail messages according to an exemplary embodiment of the present disclosure.

FIG. 3 illustrates a sequence 300 of interactions between a single media server 120 (depicted twice in the figure for clarity) and two SIP servers 130a and 130b according to an exemplary embodiment of the present disclosure. The illustration is exemplary only, and illustrates a call being established and a voicemail being delivered in the second SIP session initiated by the media server 120. A call may also be established and a voicemail delivered in the first SIP session initiated by the media server 120, as illustrated in FIG. 4. Furthermore, steps in the illustrated sequence may occur in a different order or concurrently, and not all steps are necessary for a successful delivery of a voicemail message.

At step 301, the media server 120 may initiate the first SIP session with SIP server 130a by transmitting a first invite request. The first invite request may include a source phone number determined by a caller ID module 114, a target phone number (i.e., the phone number to be called), and a call identifier uniquely identifying the first SIP session. Upon receiving the first invite request, SIP server 130a may transmit the request to a carrier gateway 140 (e.g., to a SIP server 130c at the carrier gateway 140).

At step 305, SIP server 130a may transmit a "trying" response (e.g., response code 100 of the SIP Protocol) indicating that SIP server 130a has received the first invite request and is trying to establish a SIP session.

At step 310, SIP server 130a may transmit a "ringing" response (e.g., response code 180 of the SIP Protocol), indicating that the user device 160 has received the first invite request and is alerting the user 145 of an incoming call. According to an exemplary embodiment, the alert may be brief (e.g., the device may ring 2 seconds or less), or silent. According to another exemplary embodiment, rather than a "ringing" response, SIP server 130a may transmit a session progress response (e.g., response code 183 of the SIP Protocol), indicating information about the progress of the session. Collectively, the "ringing" and "session progress" responses may be referred to as provisional responses, and the media server 120 may respond to either provisional response the same way.

Once the media server receives (e.g., through the socket listener 122a) the "ringing" (or "session progress") response, it may initiate a second SIP session, this time with SIP server 130b by sending a second invite request at step 315, much like at step 301. The second invite request may include a source phone number determined by the caller ID module 114 (which may be different than the source phone number included in the first invite request), the target phone number, and a call identifier uniquely identifying the second SIP session. Upon receiving the second invite request, SIP server 130b may transmit the request to carrier gateway 140 (e.g., to a SIP server 130c at the carrier gateway 140). Socket listener 122b may begin listening for responses from SIP server 130b, while socket listener 122a continues listening for responses from SIP server 130a.

At step 320, SIP server 130b may transmit a "trying" response (e.g., response code 100 of the SIP Protocol) indicating that SIP server 130b has received the first invite request and is trying to establish a SIP session.

At step 325, SIP server 130b may transmit a "ringing" response (e.g., response code 180 of the SIP Protocol), indicating that the user device 160 has received the second invite request and is alerting the user 145 of an incoming call. According to an exemplary embodiment, the alert may be brief (e.g., the device may ring 2 seconds or less), or silent. According to an exemplary embodiment, rather than a "ringing" response, SIP server 130b may transmit a session progress response (e.g., response code 183 of the SIP Protocol), indicating information about the progress of the session. Collectively, the "ringing" and "session progress" responses may be referred to as provisional responses, and the media server 120 may respond to either provisional response the same way.

At step 330, SIP server 130b may transmit a success response (e.g., an "OK" response with response code 200 of the SIP Protocol) indicating that a call has been successfully established between the media server 120 and the user device 140 on the SIP session associated with SIP server 130b. After the "OK" response, the media server 120 may transmit media packets on the call to prevent the call from being terminated by the carrier gateway 140. The media packets may include, for example, white noise or other content to prevent a carrier gateway that interprets silence as an error (e.g., no packets received) from terminating the call. In response to the success response, at step 335, the media server 120 may transmit an acknowledgement to SIP server 130b.

At step 338, the media server (e.g., using the voicemail transmission module 126) may receive and analyze audio from the voicemail system 155 to determine when the voicemail system 155 is ready to receive a voicemail message. The process of analyzing the audio is described in detail above and below in connection with FIG. 5. Once the media server 120 determines the voicemail system 155 is ready, it may transmit the voicemail message (e.g., via the voicemail transmission module 126) to the voicemail system 155 at step 340.

At step 365, once the media server 120 has transmitted the voicemail message, the event session controller may transmit a "Bye" request to SIP server 130b to terminate the call. After the call is terminated, at step 370 SIP server 130b may transmit an "OK" response (e.g., response code 200 of the SIP Protocol) indicating the "Bye" request was successful.

In response to the media server 120 establishing a call with the user device 160 via the second SIP session (i.e., on SIP server 130b), the media server may terminate the first SIP session on SIP server 130a, before, after, or concurrently with the media server 120 delivering the voicemail message on the second SIP session.

At step 345, the media server 120 may transmit a "cancel" request to SIP server 130a, cancelling the first invite request of step 301. At step 350, SIP server 130a may transmit an "OK" response (e.g., response code 200 of the SIP Protocol) indicating the request was cancelled, followed by a "request terminated" response (e.g., response code 487 of the SIP Protocol) at step 355 confirming the invite request was terminated. At step 360, the media server 120 may transmit an acknowledgement to SIP server 130a acknowledging receipt of the "request terminated" response.

In some instances, either or both SIP servers 130 may report a success response (e.g., response code 200 of the SIP Protocol) without first providing a provisional response (e.g., response code 180 or 183 of the SIP Protocol). This may happen, for example, if the user device 160 is turned off or in airplane mode. In such instances, the sequence may proceed as above, skipping steps 310 and 325.

FIG. 4 illustrates a sequence 400 of interactions between a single media server 120 (depicted twice for clarity) and two SIP servers 130a and 130b according to an exemplary embodiment of the present disclosure. The illustration is exemplary only, and illustrates a call being established and a voicemail being delivered on the first SIP session initiated by the media server 120. A call may also be established and a voicemail delivered on the second SIP session initiated by the media server 120, as illustrated in FIG. 3. Furthermore, steps in the sequence may occur in a different order or concurrently, and not all steps are necessary for a successful delivery of a voicemail message.

At step 401, the media server 120 may initiate the first SIP session with SIP server 130a by transmitting a first invite request. The first invite request may include a source phone number determined by a caller ID module 114, a target phone number (i.e., the phone number to be called), and a call identifier uniquely identifying the first SIP session. Upon receiving the first invite request, SIP server 130a may transmit the request to a carrier gateway 140 (e.g., to a SIP server 130c at the carrier gateway 140).

At step 405, SIP server 130a may transmit a "trying" response (e.g., response code 100 of the SIP Protocol) indicating that SIP server 130a has received the first invite request and is trying to establish a SIP session.

At step 410, SIP server 130a may transmit a "ringing" response (e.g., response code 180 of the SIP Protocol), indicating that the user device 160 has received the first invite request and is alerting the user 145 of an incoming call. According to an exemplary embodiment, the alert may be brief (e.g., the device may ring 2 seconds or less), or silent. According to an exemplary embodiment, rather than a "ringing" response, SIP server 130a may transmit a session progress response (e.g., response code 183 of the SIP Protocol), indicating information about the progress of the session. Collectively, the "ringing" and "session progress" responses may be referred to as provisional responses, and the media server 120 may respond to either provisional response the same way.

Once the media server receives (e.g., through the socket listener 122a) the "ringing" (or "session progress") response, it may initiate a second SIP session, this time with SIP server 130b by sending a second invite request at step 415, much like at step 401. The second invite request may include a source phone number determined by the caller ID module 114 (which may be different than the source phone number included in the first invite request), the target phone number, and a call identifier uniquely identifying the second SIP session. Upon receiving the second invite request, SIP server 130b may transmit the request to carrier gateway 140 (e.g., to a SIP server 130c at the carrier gateway 140). Socket listener 122b may begin listening for responses from SIP server 130b, while socket listener 122a continues listening for responses from SIP server 130a.

At step 420, SIP server 130b may transmit a "trying" response (e.g., response code 100 of the SIP Protocol) indicating that SIP server 130b has received the first invite request and is trying to establish a SIP session.

At step 425, SIP server 130b may transmit a "ringing" response (e.g., response code 180 of the SIP Protocol), indicating that the user device 160 has received the second invite request and is alerting the user 145 of an incoming call. According to an exemplary embodiment, the alert may be brief (e.g., the device may ring 2 seconds or less), or silent. According to an exemplary embodiment, rather than a "ringing" response, SIP server 130b may transmit a session progress response (e.g., response code 183 of the SIP Protocol), indicating information about the progress of the session. Collectively, the "ringing" and "session progress" responses may be referred to as provisional responses, and the media server 120 may respond to either provisional response the same way.

At step 430, SIP server 130a may transmit a success response (e.g., an "OK" response with response code 200 of the SIP Protocol) indicating that a call has been successfully established between the media server 120 and the user device 140 on the SIP session associated with SIP server 130a. After the "OK" response, the media server 120 may transmit media packets on the call to prevent the call from being terminated by the carrier gateway 140. The media packets may include white noise or other content to prevent a carrier gateway that interprets silence as an error (e.g., no packets received) from terminating the call. In response to the success response, at step 435, the media server 120 may transmit an acknowledgement to SIP server 130a.

At step 438, the media server (e.g., using the voicemail transmission module 126) may receive and analyze audio from the voicemail system 155 to determine when the voicemail system 155 is ready to receive a voicemail message. The process of analyzing the audio is described in detail above and below in connection with FIG. 5. Once the media server 120 determines the voicemail system 155 is ready, it may transmit the voicemail message (e.g., via the voicemail transmission module 126) to the voicemail system 155 at step 440.

At step 465, once the media server 120 has transmitted the voicemail message, the event session controller may transmit a "Bye" request to SIP server 130*a* to terminate the call. After the call is terminated, at step 470, SIP server 130*a* may transmit an "OK" response (e.g., response code 200 of the SIP Protocol) indicating the "Bye" request was successful.

In response to the media server 120 establishing a call with the user device 160 via the first SIP session (i.e., on SIP server 130*a*), the media server 120 may terminate the second SIP session on SIP server 130*b*, before, after, or concurrently with the media server 120 delivering the voicemail message on the first SIP session on SIP server 130*a*.

At step 445, the media server 120 may transmit a "cancel" request to SIP server 130*b*, cancelling the second invite request of step 415. At step 450, SIP server 130*b* may transmit an "OK" response (e.g., response code 200 of the SIP Protocol) indicating the request was cancelled, followed by a "request terminated" response (e.g., response code 487 of the SIP Protocol) at step 455 confirming the invite request was terminated. At step 460, the media server 120 may transmit an acknowledgement to SIP server 130*b* acknowledging receipt of the "request terminated" response.

In some instances, either or both SIP servers 130 may report a success response (e.g., response code 200 of the SIP Protocol) without first providing a provisional response (e.g., response code 180 or 183 of the SIP Protocol). This may happen, for example, if the user device 160 is turned off or in airplane mode. In such instances, the sequence may proceed as above, skipping steps 410 and 425.

Figure 5:
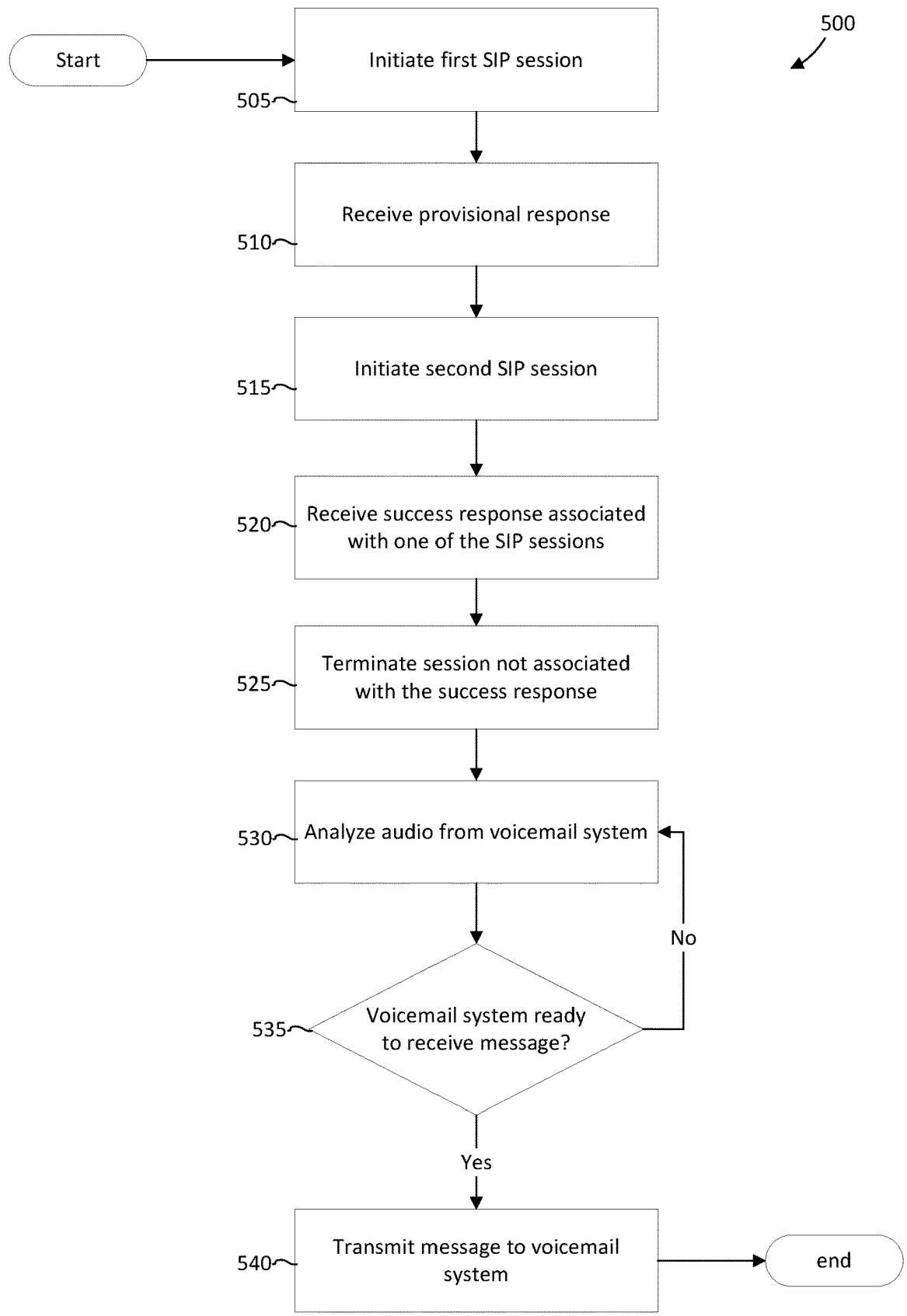
FIG. 5 is a flowchart showing a process of delivering a voicemail message according to an exemplary embodiment of the present disclosure.

FIG. 5 illustrates a process 500 for delivering an audio message (i.e., a voicemail message) to a user device 160 without causing the user device 160 to ring, according to an exemplary embodiment of the disclosure. The process of FIG. 5 may be performed by a media server 120 according to an exemplary embodiment of the present disclosure. Note that the steps described below with respect to FIGS. 5-6 can be performed in a different order, combined, or omitted as appropriate in different embodiments. According to an exemplary embodiment, the media server 120 may deliver the voicemail message in a response to a request received from a dispatch module 110 as described in FIGS. 2 and 6.

At step 505, the process 500 may initiate (e.g., using an event session controller 124 of the media server 120) a first SIP session with a first SIP server 130*a*. The event session controller 124 may initiate the session by creating a first invite request and transmitting it to the first SIP server 130*a*. The first invite request may include a first source phone number (i.e., the phone number from which the call will placed), a target phone number (i.e., the phone number associated with the user device), and a first call identifier. The first call identifier may be a unique identifier containing any number of characters (e.g., alphanumeric characters) that may be used to uniquely identify the first SIP session. For example, the first call identifier may be a randomly generated character string, such as 3a5exrt649e027abfa4a. After the first invite request is transmitted to the first SIP server 130*a*, the first SIP server 130*a* may transmit the request to a carrier gateway 140 (e.g., to a SIP server 130*c* of the carrier gateway 140), which may respond (via the first SIP server 130*a*) with a provisional response indicating a session state (i.e., indicating the current progress of the session).

At step 510, the media server 120 may receive (e.g., via the first socket listener 122*a*) the provisional response from the first SIP server 130*a* indicating the session state. The provisional response may be a ringing response code indicating that the user device is in a ringing state (e.g., response code 180 of the SIP Protocol), or a session progress response code (e.g., response code 183 of the SIP Protocol) indicating information about the progress of the session.

At step 515, in response to receiving the provisional response, the event session controller 124 may initiate a second SIP session at a second SIP server 130*b*. The event session controller 124 may initiate the second SIP session by sending a second invite request. Like the first invite request, the second invite request may include a second source phone number (which may be the same as or different from the first source phone number), the target phone number, and a second call identifier. The second call identifier, like the first call identifier, is a unique identifier containing any number of characters (e.g., alphanumeric characters) that may be used to uniquely identify a SIP session. The second SIP server 130*b* may then transmit the invite request to the carrier gateway 140, and a second socket listener 122*b* associated with the second SIP session may listen for responses to the invite request. According to an exemplary embodiment, the event session controller may cause the user device 160 to produce an alert (e.g., a brief ring) indicating an incoming call in response to initiating the first or second SIP session, or an alert indicating a missed call in response to initiating the first or second SIP session. According to an exemplary embodiment, the first call identifier and the second call identifier may the same except for a prefix prepended to the sequence of characters, or a suffix appended to the sequence of characters. The prefix or suffix may indicate whether the call identifier corresponds to the first SIP session or the second SIP session. For example, the first and second call identifiers may each include the sequence befxra65430b011ae6024, and the event session controller 124 may add the prefix "S1-" to indicate that the first call identifier (S1-befxra65430b011ae6024) corresponds to the first SIP session and the prefix "S2-" to indicate that the second call identifier (S2-befxra65430b011ae6024) corresponds to the second SIP session. Similarly, the event session controller 124 may append a suffix so that befxra65430b011ae6024-S1 corresponds to the first session, and befxra65430b011ae6024-S2 corresponds to the second session. According to an exemplary embodiment, the first and second source phone numbers may be selected by a caller ID module 114 based on a reputation score associated with each phone number, as described in FIGS. 2 and 6.

At step 520, the event session controller 124 may receive a success response (e.g., response code 200 of the SIP Protocol) indicating a call was established with the user device 160. The call may have been established in association with the first SIP session (in which case the success response would be received via the first socket listener 122*a*), or in association with the second SIP session (in which case the success response would be received via the second socket listener 122*b*).

At step 525, in response to receiving the success response, the event session controller 124 may terminate the SIP session not associated with the success response. For example, if the success response originated from the first SIP session, the event session controller 124 may terminate the second SIP session. Alternately, if the success response originated at the second SIP session, the event session controller 124 may terminate the first SIP session. Terminating the SIP session not associated with the success response may cause the user device 160 to generate an alert indicating a missed call. According to an exemplary embodiment, the event session controller may terminate the SIP session not associated with the success response without causing the user device 160 to produce an alert indicating an incoming call.

At step 530, the media server 120 (e.g., using the voicemail transmission module 126) may receive audio data from the voicemail system 155 and analyze the audio to determine whether the voicemail system 155 is ready to accept a voicemail message. The audio data may be a voicemail prompt (e.g., inviting the caller to leave a message). The voicemail transmission module 126 may analyze the waveform of the audio to detect a signal (e.g., a beep) indicating the voicemail system is ready. For example, the voicemail transmission module 126 may detect audio with a frequency characteristic of a beep at the end of a voicemail prompt followed by silence (i.e., during which the voicemail system 155 is recording), and determine the voicemail system 155 is ready to receive the voicemail message. The frequency may be determined empirically based on the carrier providing the voicemail service (e.g., by measuring the frequency of the beep generated by the carrier's voicemail service). According to an exemplary embodiment, the voicemail transmission module 126 may also estimate (based on the audio analysis) the number of words spoken as part of the voicemail prompt to confirm the audio is coming from the voicemail system 155 rather than a live recipient before transmitting the message. A small number of words (e.g., 5 or fewer) may be characteristic of a greeting from a live recipient (e.g., "Hello," or "Hello, Paul speaking"). For example, the voicemail transmission module may determine the number of words by detecting short periods of silence in the audio, indicative of pauses in speech. If the voicemail transmission module 126 determines the audio is coming a live recipient, it may notify the event session controller 124, which may terminate the call rather than delivering the message.

At step 540, the media server 120 may deliver the voicemail message to the voicemail system 155. The voicemail transmission module 126 may deliver the voicemail message by playing the message (e.g., playing an audio file containing the message) on the call, which the voicemail system 155 may record and store. The media server 120 may then (through the event session controller 124) terminate the session on which the voicemail message was delivered.

Figure 6:
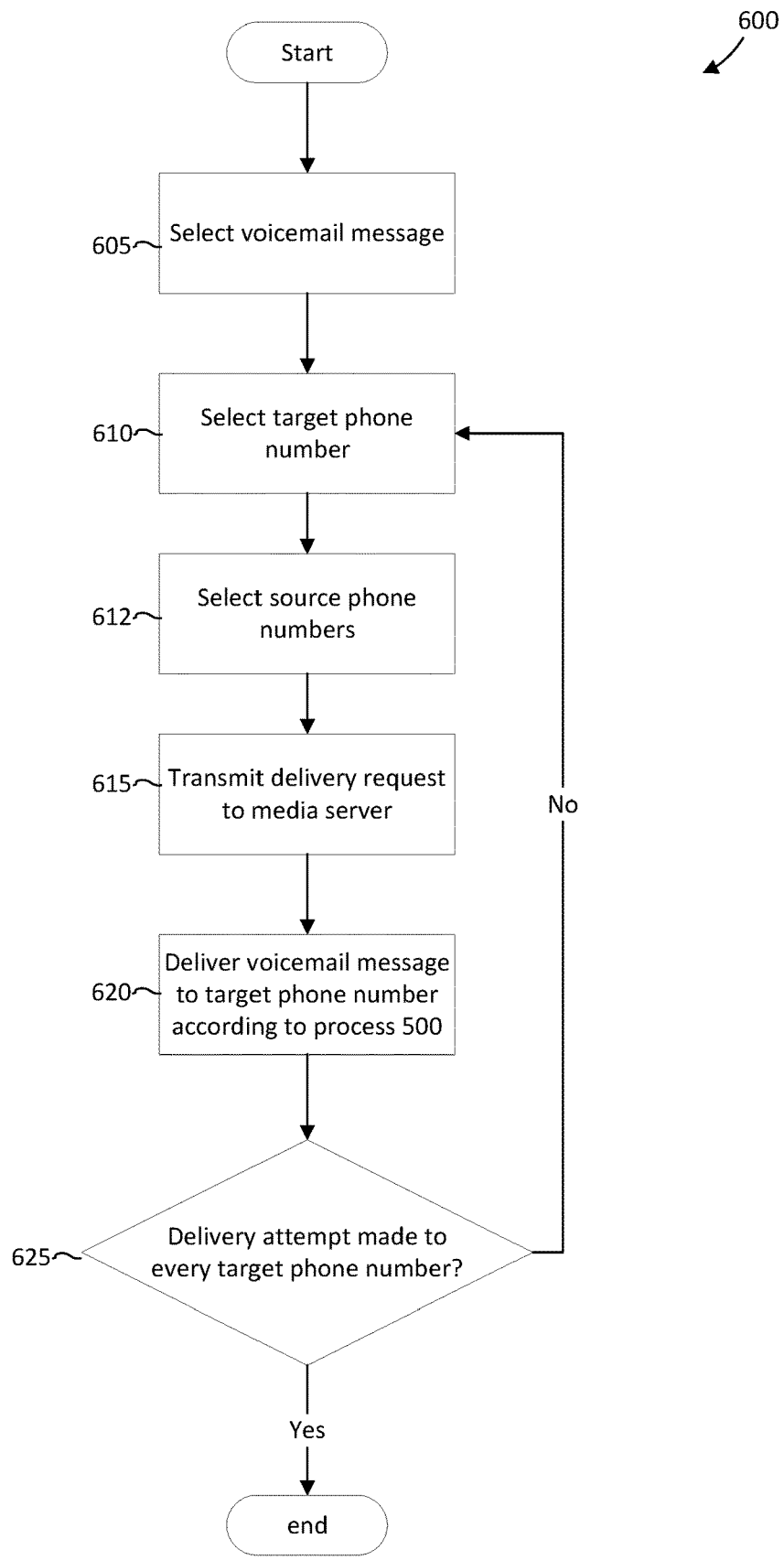
FIG. 6 is a flowchart showing a process of delivering a voicemail message according to an exemplary embodiment of the present disclosure.

FIG. 6 illustrates a process 600 for delivering an audio message (i.e., a voicemail message) to any number of user devices 160, according to an exemplary embodiment. The process may be performed, for example, by a dispatch module 110. The dispatch module 110 may be part of the media server 120, or an independent component in communication with the media server 120.

At step 605, the process (e.g., using the request module 112 of the dispatch module 110) may select a voicemail message to transmit to one or more user devices 160. The voicemail message may be selected from among any number of voicemail messages stored, for example, in a voicemail delivery information database 115. The voicemail message may be stored as an audio file, or as text which may be converted to an audio file (e.g., by the request module 112, using a text-to-speech service). The voicemail message may be associated with a list of one or more target phone numbers, each target phone number associated with a user device 160, to which the voicemail message is to be delivered. The request module 112 may retrieve the list of target phone numbers associated with the voicemail message from the voicemail delivery information database 115.

At step 610, the process may select (e.g., using the request module 112) a target phone number from the list of target phone numbers, the target phone number being the phone number associated with the next user device 160 to which the media server 120 may attempt to deliver the voicemail message. For example, the request module 112 may select the first phone number on the target phone number list for which the voicemail message has not been delivered.

At step 615, the process may select (e.g., using the caller ID module 114), a first source phone number for a first SIP session (e.g., established with a first SIP server 130*a*) and a second source phone number for a second SIP session (e.g., established with a second SIP server 130*b*) from a list of available source phone numbers. The first and second source phone numbers may be the same number or different numbers. The list of available source phone numbers may be stored on and retrieved from the voicemail delivery information database 115.

According to an exemplary embodiment, each available source phone number in the list may be associated with a reputation score (e.g., a score from 0 to 100) indicating how likely it is the phone number will be associated with unwanted calls (e.g., spam) by users 145 or carriers when a call is initiated from the phone number. For example, a score of 100 may indicate the worst reputation (i.e., the phone number will almost certainly be classified as associated with unwanted calls), and a score of 0 may indicate the best reputation (i.e., the phone number will almost certainly not be associated with unwanted calls. Alternately, a high score may indicate a good reputation, and a low score may indicate a low reputation. For simplicity, examples herein assume a lower score corresponds to a lower reputation. A phone number with a higher reputation score may be more likely to be blocked by a carrier or user, or labeled as spam or an advertisement (e.g., as part of caller ID information presented on user devices 160) than a phone number with a lower reputation score. The caller ID module 114 may select the first and second source phone numbers based on their associated reputation scores. According to an exemplary embodiment, the caller ID 114 module may select a source phone number from the list based on its associated reputation score being above a threshold.

According to an exemplary embodiment, the caller ID module 114 may periodically update the reputation score associated with a phone number based on, for example, the number of times a call using the phone number as the source phone number fails. For example, a carrier or user device 160 may reject calls from a phone number that has been associated with advertising, which would make voicemail delivery attempts from that phone number likely to fail. The media server 120 may report the outcome of a voicemail delivery attempt (e.g., success or failure) to the dispatch module 110. Based on the reported outcome, the caller ID module 114 may increase the reputation score of a phone number (e.g., from 10 to 12) each time a call using the phone number as the source phone number fails. The caller ID module 114 may also decrease the reputation score of a phone number (e.g., from 12 to 10) each time a call using the phone number as the source phone number succeeds. The caller ID module 114 may also increase or decrease the reputation score based on calls from the phone number failing or succeeding a predetermined number of times (e.g., the reputation score may be increased by two points for every five calls that fail). If the reputation score associated with a phone number increases above a threshold, the caller ID module 114 may (temporarily or permanently) not select the phone number as the first and/or second source phone number.

According to an exemplary embodiment, the caller ID module 114 may load balance source phone numbers (e.g., rotate between different source phone numbers used for calls) to prevent calls from being associated with spam or throttled. A source phone number may be selected because it is associated with fewer invite requests than a different source phone number. For example, a carrier or third-party service may tag a phone number from which a large number of calls originate in a short period of time as a phone number associated with spam. As a result, subsequent calls from the phone number may be blocked, or the user device 160 may display (e.g., as part of the caller ID information associated with the call) an indication that the phone call is likely an advertisement, decreasing the likelihood of successful voicemail message delivery, and/or of a user 145 listening to the voicemail message even if successfully delivered. To account for this, the caller ID module 114 may load balance the phone numbers used as source phone numbers by rotating through the list of available phone numbers when selecting a source phone number. For example, the list of available phone numbers may include 20 phone numbers. The caller ID module 114 may select the first number on the list as the source phone number for a first request, the second number for a second request, and so on. Or the caller ID module 114 may select a new number from the list after a set number of requests using a source phone number (e.g., the caller ID module 114 may select a new phone number as the source phone number every 8 requests).

At step 615, the dispatch module 110 may prepare and transmit a delivery request to the media server 120 instructing the media server to deliver the voicemail message. The delivery request may include the voicemail message (e.g., as an audio file or audio data), the target phone number, and the first and second source phone numbers as selected in steps 605, 610, and 612.

At step 620, the media server 120 may attempt to deliver the voicemail message to the target phone number following the process 500 described in FIG. 5. The media server 120 may notify the dispatch module 110 of the outcome of the delivery attempt, i.e., whether the attempt was successful or not. As described at step 612, the caller ID module 114 may update the reputation score of the first and/or second source phone numbers based on the outcome of the delivery attempt.

At step 625, the process (e.g., using the dispatch module 110) may determine whether a delivery attempt has been made to every target phone number in the list of target phone numbers associated with the voicemail message. If so, the process may end, or the process may restart at step 605, selecting a new voicemail message. If a delivery attempt has not been made to every target phone number on the list, the process may return to step 610, where a new target phone number from the list may be selected for a subsequent delivery attempt.

Figure 7:
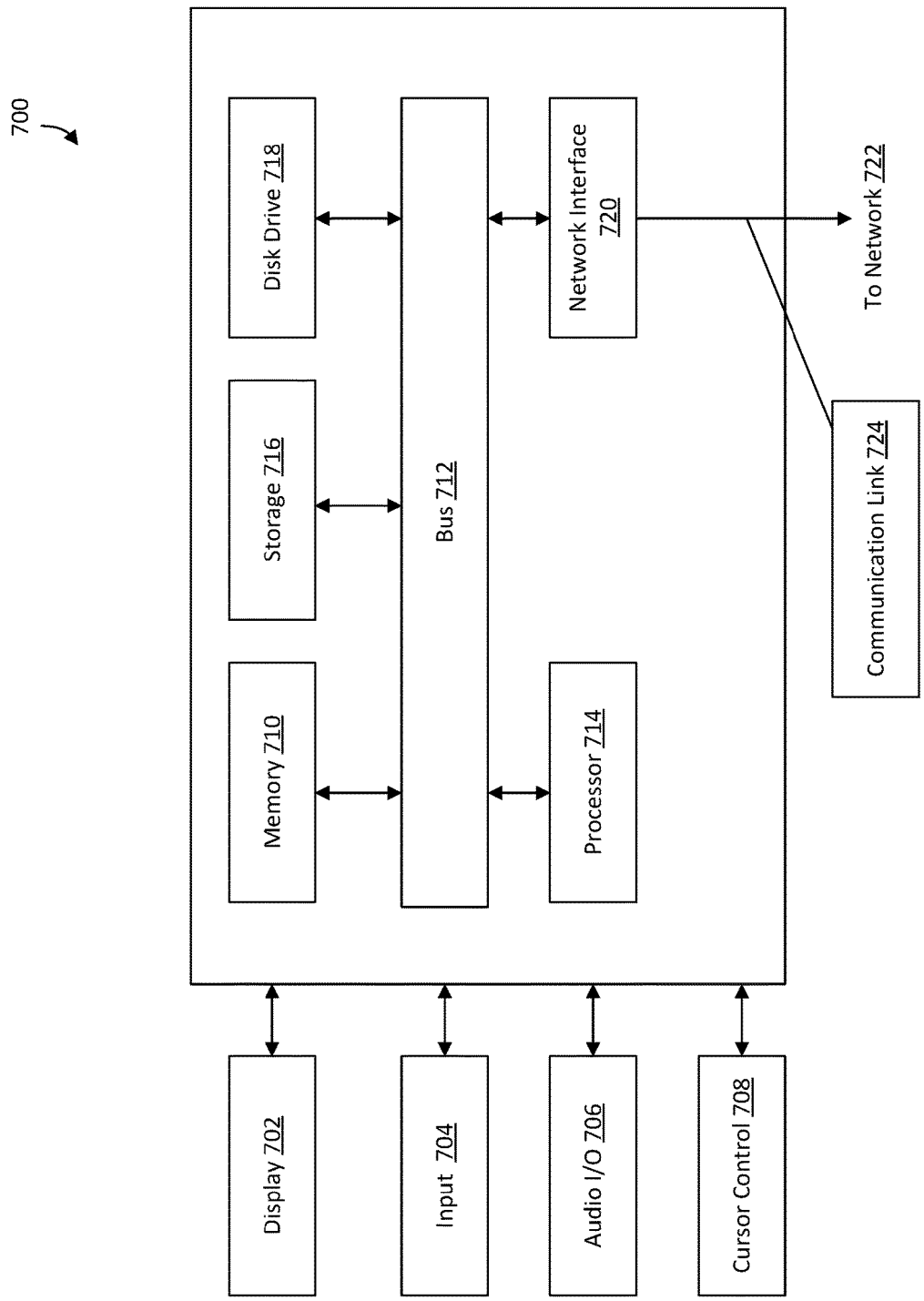
FIG. 7 is a block diagram of a system for implementing a device according to an exemplary embodiment of the present disclosure.

FIG. 7 is a block diagram of a computer 700 suitable for implementing exemplary embodiments of the dispatch module 110 and the media server 120 as described herein. In various implementations, the dispatch module 110 and media server 120 (which may be different devices or parts of the same device) may include a network computing device, such as a personal computer or server. Thus, it should be appreciated that the dispatch module 110 and the media server 120 may be implemented as the computer 700 in the following manner.

The computer 700 includes a bus 712 or other communication mechanism for communicating information data, signals, and information between various components of the computer 700. The components include an input/output (I/O) component 704 that processes a user (i.e., sender, recipient, service provider) action, such as selecting keys from a keypad/keyboard, selecting one or more buttons or links, etc., and sends a corresponding signal to the bus 712. The I/O component 704 may also include an output component, such as a display 702 and a cursor control 708 (such as a keyboard, keypad, mouse, etc.). An audio input/output component 706 may also be included to allow, for example, playback of voicemail messages for delivery to a voicemail system 155. A transceiver or network interface 720 transmits and receives signals between the computer 700 and other devices, such as SIP servers 130*a*, 130*b* via the network 722 (which may be the IP network 135). A processor 714, which can be a micro-controller, digital signal processor (DSP), or other processing component, processes these various signals, such as for display on the computer 700 or transmission to other devices via a communication link 724. The processor 714 may also control transmission of information to other devices.

The components of the computer 700 also include a system memory component 710 (e.g., RAM), a static storage component 716 (e.g., ROM), and/or a disk drive 718 (e.g., a solid-state drive, or a hard drive). The computer 700 performs specific operations by the processor 714 and other components by executing one or more sequences of instructions contained in the system memory component 710. For example, the processor 714 can perform the voicemail delivery functions described herein according to processes 500 and 600.

Logic may be encoded in a computer readable medium, which may refer to any medium that participates in providing instructions to the processor 714 for execution. Such a medium may take many forms, including but not limited to, non-volatile media or volatile media. In various implementations, non-volatile media includes optical or magnetic disks, volatile media includes dynamic memory, such as the system memory component 710. In one embodiment, the logic is encoded in non-transitory computer readable medium.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer 700. In various other embodiments of the present disclosure, a plurality of computer 700 coupled by the communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are configured to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A method of delivering voicemail communication, comprising:
    initiating, by an event session controller of a media server, a first Session Initiation Protocol (SIP) session at a first SIP server;
    receiving, at a first socket listener associated with the first SIP session, a provisional response from the first SIP server, the provisional response indicating a session state;
    initiating, by the event session controller in response to the receiving of the provisional response, a second SIP session at a second SIP server;
    receiving a success response to indicate that a call with a user device was successfully established in association with either the first SIP session or the second SIP session, wherein the success response is received at either (i) the first socket listener from the first SIP server when the call with the user device was successfully established in association with the first SIP session, or (ii) a second socket listener from the second SIP server when the call with the user device was successfully established in association with the second SIP session, the second socket listener being associated with the second SIP session;
    terminating, by the event session controller, in response to the receiving of the success response, the first SIP session or the second SIP session not associated with the success response; and
    transmitting, in response to the receiving of the success response, an audio message to a voicemail system associated with the user device.

2. The method of claim 1, wherein the provisional response comprises a ringing response code indicating that the user device is in a ringing state.

3. The method of claim 1, wherein the provisional response comprises a session progress response code indicating information about the progress of the first SIP session.

4. The method of claim 1, wherein the transmitting of the audio message comprises:
    receiving audio data from the voicemail system;
    analyzing the received audio data;
    determining, in response to the analyzing, whether the voicemail system is ready to accept a voicemail message;
    transmitting, via a voicemail transmission module, the audio message for the voicemail system in response to determining that the voicemail system is ready; and
    terminating, by the event session controller, the call.

5. The method of claim 1, wherein the event session controller terminates the first SIP session or the second SIP session not associated with the success response without causing the user device to produce an alert indicating an incoming call.

6. The method of claim 1, wherein the event session controller causes the user device to produce an alert indicating an incoming call in response to the initiating of the first SIP session or the initiating of the second SIP session.

7. The method of claim 1, wherein the event session controller causes a missed call alert to be generated on the user device in response to the terminating of the first SIP session or the second SIP session not associated with the success response.

8. The method of claim 1, wherein the initiating of the first SIP session comprises:
    creating, by the event session controller, a first invite request, the first invite request comprising a first call identifier, a first source phone number, and a target phone number; and
    transmitting, by the event session controller, the first invite request to the first SIP server, and
    wherein the initiating of the second SIP session comprises:
        creating, by the event session controller, a second invite request, the second invite request comprising a second call identifier, a second source phone number, and the target phone number; and
        transmitting, by the event session controller, the second invite request to the second SIP server.

9. The method of claim 8, comprising:
    selecting, by a caller ID module, the first phone number based on the first phone number having been associated with fewer invite requests than a third phone number; and
    selecting, by a caller ID module, the second phone number based on the second phone number having been associated with fewer invite requests than a fourth phone number.

10. The method of claim 8, comprising:
    selecting, by a caller ID module, the first source phone number based on a first reputation score associated with the first source phone number; and
    selecting, by the caller ID module, the second source phone number based on a second reputation score associated with the second source phone number.

11. The method of claim 10, wherein:
    the media server updates the first reputation score associated with the first source phone number if the first SIP session is not associated with the success response a predetermined number of times; and
    the media server updates the second reputation score associated with the second source phone number if the second SIP session is not associated with the success response a predetermined number of times.

12. The method of claim 8, wherein the first call identifier comprises a first prefix of characters followed by a first sequence of characters, the second call identifier comprises a second prefix of characters followed by a second sequence of characters, the first prefix and the second prefix being different from each other, and the first sequence and the second sequence being the same.

13. The method of claim 8, wherein the first call identifier comprises a first sequence of characters followed by a first suffix of characters, the second call identifier comprises a second sequence of characters followed by a second suffix of characters, the first sequence and the second sequence being the same, and the first suffix and the second suffix being different.

14. The method of claim 8, wherein the first and second source phone numbers are the same number.

15. The method of claim 8, wherein the first and second source phone numbers are different numbers.

16. A computing device comprising:
   a computer-readable recording medium having a computer program recorded thereon; and
   a processor configured to execute the computer program recorded on the computer-readable recording medium,
   wherein the processor, by executing the computer program, is configured to cause the computing device to:
   initiate a first SIP session at a first SIP server external to the computing device;
   associate the first SIP session with a first socket listener service, wherein the processor causes the first socket listener service to receive a provisional response from the first SIP server, the provisional response indicating a session state;
   initiate, in response to receiving the provisional response, a second SIP session at a second SIP server external to the computing device;
   associate the second SIP session with a second socket listener service;
   receive a success response indicating that a call with a user device was successfully established in association with either the first SIP session or the second SIP session, wherein the processor controls (i) the first socket listener service to receive the success response from the first SIP server when the call with the user device was successfully established in association with the first SIP session, and (ii) the second socket listener service to receive the success response from the second SIP server when the call with the user device was successfully established in association with the second SIP session;
   terminate, in response to receiving the success response, the first SIP session or the second SIP session not associated with the success response; and
   transmit, in response to receiving the success response, an audio message to a voicemail system associated with the user device.

17. The computing device of claim 16, wherein the processor is configured to:
   control the first socket listener service to listen for responses associated with the first SIP session from the first SIP server; and
   control the second socket listener service to listen for responses associated with the second SIP session from the second SIP server.

18. The computing device of claim 16, wherein the provisional response comprises a ringing response code indicating the user device is in a ringing state.

19. The computing device of claim 16, wherein the provisional response comprises a session progress response code indicating information about the progress of the first SIP session.

20. The computing device of claim 16, wherein the processor is configured to, in transmitting the audio message:
   receive audio data from the voicemail system;
   analyze the received audio data;
   determine, in response to analyzing the audio data, whether the voicemail system is ready to accept a voicemail message;
   transmit the audio message for the voicemail system in response to determining that the voicemail system is ready; and
   terminate the call.

21. The computing device of claim 16, wherein the processor is configured to cause the computing device to terminate the first SIP session or the second SIP session not associated with the success response without causing the user device to produce an alert indicating an incoming call.

22. The computing device of claim 16, wherein the processor is configured to cause the computing device to cause the user device to produce an alert indicating an incoming call in response to the initiating of the first SIP session or the initiating of the second SIP session.

23. The computing device of claim 16, wherein the processor is configured to cause the computing device to cause a missed call alert to be generated on the user device in response to the terminating of the first SIP session or the second SIP session not associated with the success response.

24. The computing device of claim 16, wherein the processor is configured to, in initiating the first SIP session:
   create a first invite request, the first invite request comprising a first call identifier, a first source phone number, and a target phone number; and
   transmit the first invite request to the first SIP server, and
   wherein the processor is configured to, in initiating the second SIP session:
   create a second invite request, the second invite request comprising a second call identifier, a second source phone number, and the target phone number; and
   transmit the second invite request to the second SIP server.

25. The computing device of claim 24, wherein the processor is configured to cause the computing device to:
   select the first phone number based on the first phone number having been associated with fewer invite requests than a third phone number; and
   select the second phone number based on the second phone number having been associated with fewer invite requests than a fourth phone number.

26. The computing device of claim 24, wherein the processor is configured to cause the computing device to:
   select the first source phone number based on a first reputation score associated with the first source phone number; and
   select the second source phone number based on a second reputation score associated with the second source phone number.

27. The computing device of claim 26, wherein the processor is configured to cause the computing device to:
   update the first reputation score associated with the first source phone number if the first SIP session is not associated with the success response a predetermined number of times; and update the second reputation score associated with the second source phone number if the second SIP session is not associated with the success response a predetermined number of times.

28. The computing device of claim 24, wherein the first call identifier comprises a first prefix of characters followed by a first sequence of characters, the second call identifier comprises a second prefix of characters followed by a second sequence of characters, the first prefix and the second prefix being different from each other, and the first sequence and the second sequence being the same.

29. The computing device of claim 24, wherein the first call identifier comprises a first sequence of characters followed by a first suffix of characters, the second call identifier comprises a second sequence of characters followed by a second suffix of characters, the first sequence and the second sequence being the same, and the first suffix and the second suffix being different.

30. The computing device of claim 24, wherein the first and second source phone numbers are the same number.

31. The computing device of claim 24, wherein the first and second source phone numbers are different numbers.

* * * * *